(12) United States Patent
Weber et al.

(10) Patent No.: US 9,568,631 B2
(45) Date of Patent: Feb. 14, 2017

(54) CAPACITIVE SENSOR FOR A ROLLER AND METHOD FOR RECOGNIZING OBJECTS AT A ROLLER TRACK

(71) Applicant: SICK AG, Waldkirch (DE)

(72) Inventors: Thomas Weber, Waldkirch (DE); Christoph Märkle, Waldkirch (DE); Davorin Jaksic, Waldkirch (DE)

(73) Assignee: SICK AG, Waldkirch (DE)

( * ) Notice: Subject to any disclaimer, the term of this patent is extended or adjusted under 35 U.S.C. 154(b) by 21 days.

(21) Appl. No.: 14/608,590

(22) Filed: Jan. 29, 2015

(65) Prior Publication Data

US 2015/0260871 A1    Sep. 17, 2015

(30) Foreign Application Priority Data

Mar. 11, 2014 (EP) .................................. 14158841

(51) Int. Cl.
   *G01V 3/02* (2006.01)
   *B65G 39/02* (2006.01)
   *B65G 43/08* (2006.01)
   *B65G 13/06* (2006.01)

(52) U.S. Cl.
   CPC ............... *G01V 3/02* (2013.01); *B65G 13/06* (2013.01); *B65G 39/02* (2013.01); *B65G 43/08* (2013.01); *B65G 2203/042* (2013.01)

(58) Field of Classification Search
   CPC combination set(s) only.
   See application file for complete search history.

(56) References Cited

U.S. PATENT DOCUMENTS

| 7,023,684 | B1 * | 4/2006 | Chen ................ G01D 5/2415 361/287 |
| 2004/0207385 | A1 * | 10/2004 | Gafner .............. A61M 5/31556 324/76.11 |
| 2011/0116733 | A1 | 5/2011 | Siraky et al. |
| 2012/0312663 | A1 | 12/2012 | Schmidt et al. |

FOREIGN PATENT DOCUMENTS

| DE | 10131019 A1 | 12/2002 |
| DE | 202007015529 U1 | 3/2009 |
| EP | 2657663 A1 | 10/2013 |
| JP | 2009113987 A * | 5/2009 ............. B65G 39/00 |

OTHER PUBLICATIONS

European Patent Office search report from counterpart application EP 14158841.8 dated Apr. 9, 2014.

* cited by examiner

*Primary Examiner* — Clayton E LaBalle
*Assistant Examiner* — Jas Sanghera
(74) *Attorney, Agent, or Firm* — Nath, Goldberg & Meyer; Jerald L. Meyer; Stanley N. Protigal

(57) ABSTRACT

A capacitive sensor (10) for a roller (12) of a roller track is provided which has a plurality of measuring electrodes (18) as well as a measurement unit (28) for determining capacitances between measuring electrodes (18) to recognize an object (42) located at the roller track with reference to capacitance changes. In this respect, at least some of the measuring electrodes (18) are arranged co-rotating with the roller (12, 16).

16 Claims, 2 Drawing Sheets

Figure 1:
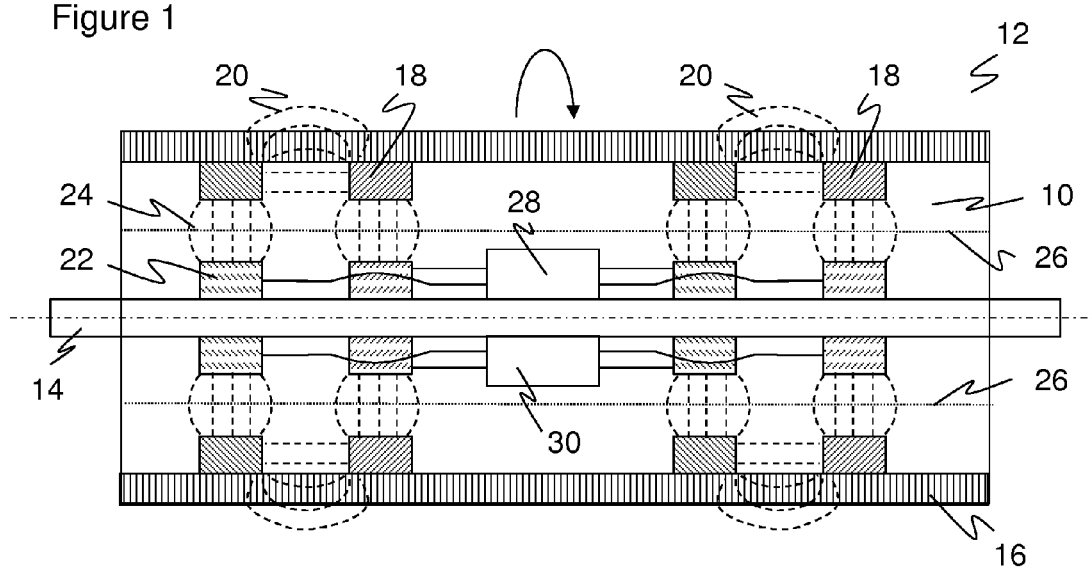

CAPACITIVE SENSOR FOR A ROLLER AND METHOD FOR RECOGNIZING OBJECTS AT A ROLLER TRACK

The invention relates to a capacitive sensor for a roller of a roller track and to a method for recognizing objects located at a roller track in accordance with the preamble of claim 1 and of claim 16 respectively.

Roller tracks are as a rule used as roller conveyors in storage and conveying technology. Some of the rollers have an active drive which sets them into rotation. The remaining passive rollers can be moved along by the active rollers via belts or the objects set into motion bridge such rollers due to inertia. To control the material flow, the roller track should be monitored for the presence of objects at specific positions of the conveying path. The most varied sensors are known for this purpose such as optical sensors, magnetic sensors, inductive sensors or capacitive sensors which are attached to the corresponding location of the conveying path to detect the conveyed products at the roller track.

The mounting of such sensors using a suitable fastening technique and cabling for connection to an energy supply and to a communication network, that is to a control unit or in a ladder network to further sensors, requires a substantial effort and/or costs, additional space requirements and an individual adjustment of the numerous separately mounted sensors. In addition, externally mounted sensors are generally prone to mechanical impairment by the environment such as contamination of or damage to the detection surfaces. The servicing effort is thereby increased and a robust housing configuration furthermore becomes necessary for the mechanical protection of the sensors.

It is therefore proposed in the prior art, for instance DE 101 31 019 A1, to integrate a sensor system directly into rollers of a roller track. In an embodiment, the integrated sensor system comprises capacitive sensors which are mounted such that their detection fields are orientated in the direction of the conveyed products. Rollers comprising plastic should be excluded in this respect; however, it is not disclosed how this should be achieved.

DE 20 2007 015 529 U1 discloses a roller for a roller track having an integrated capacitive sensor which additionally provides a reference sensor on a side remote from the conveying side. With an object conveyed over the rollers, a switch signal is then determined from a difference signal between the signal of the actual sensor and of the reference sensor. It is additionally proposed to arrange a plurality of sensors behind one another in the longitudinal direction of the roller.

It is problematic with the conventional approaches using integrated capacitive sensors that due to various external influences such as irregularities in the movement of the roller due to bearing play, temperature changes, wear or contamination, the sensor signal fluctuates to a degree such that a reliable object recognition is not possible. This is also not remedied by the reference signal of a further capacitive sensor in accordance with DE 20 2007 015 529 U1 or by a segmentation in the longitudinal direction of the roller.

There are a number of other applications for capacitive sensors. EP 2 657 663 A1 discloses a capacitive filling level sensor having a probe which has a plurality of segments following one another in a longitudinal direction and which in turn has a plurality of electrodes in each segment. The filling level is measured by determining the capacity between electrodes of a segment at that position in a container where there is a transition between the medium and the air. This probe, like the surrounding container, is thus stationary so that similar problems to the described interference signals at movable rollers do not arise at all.

Different suppliers provide programmable evaluation chips for a multi-channel capacity measurement, for instance a PsoC chip (programmable system-on-chip) from the Cypress corporation. Such evaluation chips are very powerful and nevertheless inexpensive since they are used in large volumes for motion-sensitive screens (touchscreens) or for operating fields. Specific solutions which withstand the robust conditions of industrial reality are thus, however, a long way from fruition.

It is therefore the object of the invention to make possible an improved capacitive detection of objects at a roller track.

This object is satisfied by a capacitive sensor for a roller of a roller track and by a method for recognizing objects located at a roller track in accordance with claim 1 and claim 16 respectively. A capacitive sensor having a plurality of measuring electrodes recognizes objects located at a roller track with reference to capacity changes. The sensor is integrated into a roller of the roller track for this purpose. The roller has a rigid rotatable axle and the actual roller, i.e. a cylindrical element which rotates about the rotatable axle and which in so doing conveys objects at its outer periphery. The sensor is typically rigidly connected to the rotational axle. The invention now starts from the basic idea of co-rotating measuring electrodes with the roller between which the capacitance varying due to objects at the roller is measured. The measured capacitances are therefore then not affected by capacitance fluctuations caused by the roller, for instance by spacing fluctuations or by an inhomogeneous material distribution of the roller. In this respect, at least some of the measuring electrodes is arranged as co-rotating. In a preferred embodiment, all the measuring electrodes are then co-rotating. It is, however, also conceivable to mix the measurement concepts and also to include stationary measuring electrodes in accordance with the prior art.

The invention has the advantage that the co-rotating measuring electrodes are always located at the same position. This avoids interfering field changes in that the roller moves past the measuring electrode during its rotation and thus allows a much more precise measurement.

The sensor preferably has coupling electrodes which are arranged stationary with respect to a rotatable axle of the roller and which form coupling capacitances with measuring electrodes. The signal of the co-moved measuring electrodes is transmitted in this manner from the co-moved part of the roller into the part stationary with the rotatable axle.

First coupling electrodes preferably form a stationary ring and second coupling electrodes form a ring co-rotating with the roller. The coupling capacitances between the stationary and co-rotating part of the roller are then configured as rings arranged concentrically in one another. The capacitive coupling is maintained over the total revolution due to this geometry.

The measuring electrodes are preferably formed in ring shape about a rotatable axle of the roller. Measurement capacitances are then formed in the longitudinal direction in parallel with the rotatable axle between rings arranged next to one another. These and further arrangements of the measuring electrodes required in different embodiments should not preclude, despite the definite article, that there are further measuring electrodes without the respective named properties. In principle, all possible mixtures of geometries and arrangements are possible. Homogeneous concepts with similar measuring electrodes are, however, substantially easier to build and to evaluate.

The ring-shaped measuring electrodes preferably simultaneously act as coupling electrodes. The measuring electrodes therefore form measurement capacitances between them, on the one hand. On the other hand, the co-moved measuring electrodes also couple at coupling electrodes in the stationary part of the roller to transmit the signals there capacitively. No additional coupling electrodes are required in the co-rotating part of the roller due to this dual function.

The ring-shaped measuring electrodes are preferably segmented in the peripheral direction. A plurality of additional measurement capacitances thereby arise between the ring segments within a ring and thus an additional measurement resolution in the peripheral direction of the roller.

The measuring electrodes preferably have elongated strips in the axial direction of the roller. A field arises having a plurality of strip-shaped measuring electrodes which are aligned in parallel with the rotatable axle in the longitudinal direction. As with segmented rings, an additional measurement resolution thereby results in the peripheral direction, but with the advantage that the area of the measurement electrodes is not linked to the width of the ring.

The strips are preferably connected to a ring. The advantages of ring-shaped coupling capacitances and strip-shaped measurement capacitances are thereby combined. The strips connected to a ring provide a transformation from the radial direction to an axial direction. The measuring electrodes can take up a large area due to the axial longitudinal extent and thereby measure the capacitance changes caused by objects particularly precisely.

The sensor preferably has a plurality of segments in the axial direction each having mutually decoupled measuring electrodes. It is therefore functionally a serial arrangement of a plurality of capacitive sensors along the rotatable axle so that a better detection and a greater measurement resolution is achieved in the axial direction. The segments can be designed within themselves in all variants, but are in this respect preferably the same among one another to simplify the resulting sensor.

An evaluation unit is preferably provided which is configured to calculate a capacitance change which is resolved in space and/or time from the capacitances determined by the measurement unit and to detect or classify objects according thereto. A linguistic differentiation is therefore made here between the measurement unit which can determine the capacitances between various pairs or groups of measuring electrodes and thus with spatial resolution and at different points in time and thus with temporal resolution, and an evaluation unit for the further processing of these raw data. In principle, however, both processing procedures can also be implemented on the same chip. It is conceivable only to accommodate the measurement unit in the roller and to guide the raw data to the outside and to further process them there in the then externally configured evaluation unit.

The evaluation unit is preferably configured to determine geometry properties or movement paths of detected objects. The measurement unit provides, in general terms, a time-dependent matrix of the signals determined at the various measurement capacitances. This can now be evaluated in very different complexities. In a simple case, a check is only made whether the sum of the changes with respect to a reference signal is sufficient to consider an object as recognized. Information is, however, also available by individual evaluation or by different group combinations of measurement capacitances and by the respective time development of these signals in order to gain further information on the objects and to classify them, for example, by their sizes or movement paths.

The evaluation unit is preferably configured to determine a reference signal on an absence of objects, in particular to determine the reference signal again cyclically or on request. This reference signal or zero signal forms an expectation and, if an object is located at the roller, it triggers a significant signal change with respect to it which, however, is only maintained for the short duration of the object presence. Many interference types, for instance due to temperature fluctuations or contaminants, in contrast typically vary the signal more slowly and with a smaller amplitude. Such effects can therefore not only be taken into account initially, but rather also cyclically or on request in further operation in that the reference signal is determined again. In this respect, such an autocalibration preferably takes place automatically and only when no object is currently detected.

The evaluation unit is preferably configured for a rotational monitoring of the roller with reference to the capacitance measured with a reference element attached in the peripheral direction of the roller. As a rule, objects can only be located at the top at the roller. The remaining periphery of the roller is therefore available for different measurements. With a rotating roller, it is expected that a reference capacitance is detected once per revolution in this peripheral region. It can thus be determined whether and at which speed the roller rotates. In addition, an error recognition or an autocalibration can also utilize the signal at the reference capacitance which should only differ within a tolerance from a previously taught signal at the reference capacitance.

In an advantageous further development, a roller is provided having a sensor in accordance with the invention integrated thereat. This roller can have its own drive, that is it can be an active roller. The sensor then preferably utilizes the supply and control lines of this drive. The sensor can, however, also be used in a passive roller without its own drive. The sensor then requires its own connections or is supplied and communicates wirelessly. Alternatively, the sensor is equipped with a battery or with its own energy generation from the rotational movement.

The method in accordance with the invention can be designed in a similar manner by further features and shows similar advantages in this respect. Such further features are described in an exemplary, but not exclusive manner in the dependent claims following the independent claims.

Figure 2:
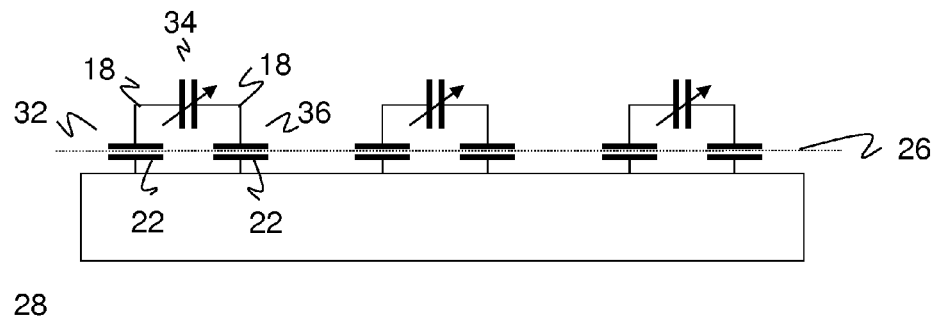
Figure 3:
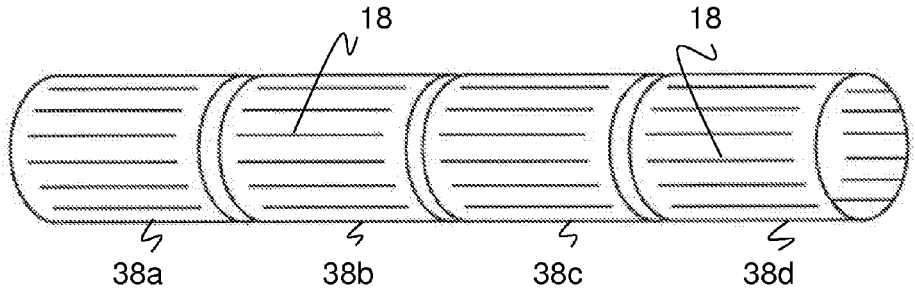
Figure 4:
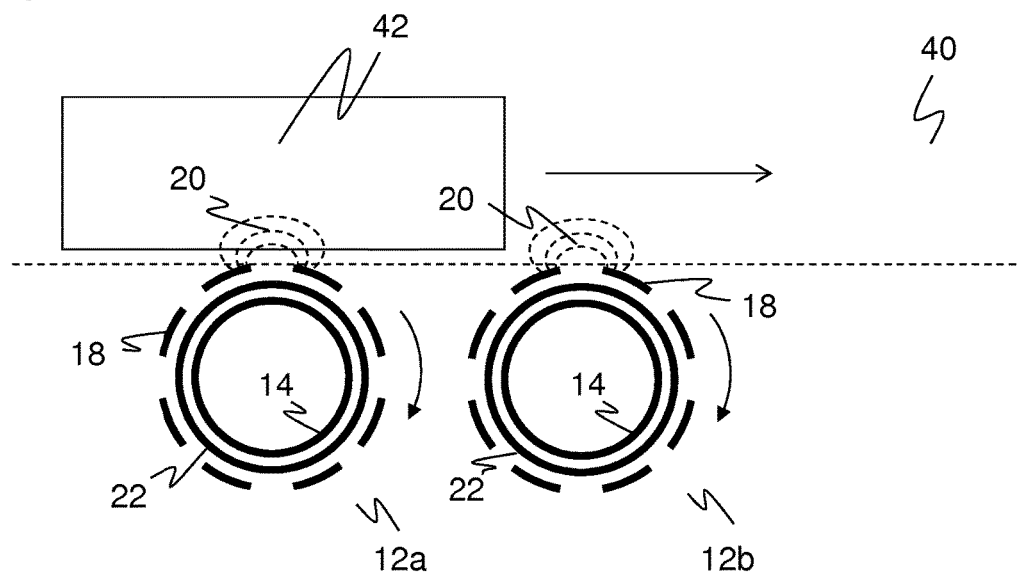
Figure 5:
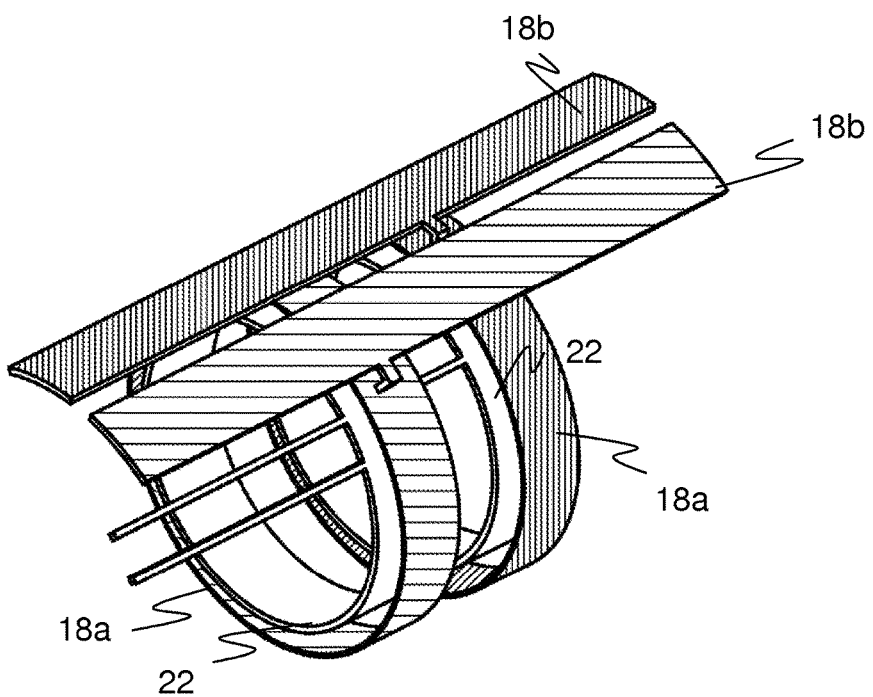

The invention will also be explained in the following with respect to further advantages and features with reference to the enclosed drawing and to embodiments. The Figures of the drawing show in:

FIG. 1 a sectional representation of a roller having a capacitive sensor therein;

FIG. 2 an equivalent circuit diagram of the control of the coupling and measurement capacitances through a measurement unit in an embodiment of a capacitive sensor;

FIG. 3 a three-dimensional outer view of the measuring electrodes of a capacitive sensor;

FIG. 4 a sectional representation of a roller track and of the electrodes of a capacitive sensor; and FIG. 5 a three-dimensional view of a configuration of coupling and measuring electrodes of an embodiment of a capacitive sensor.

FIG. 1 shows a sectional representation of a capacitive sensor 10 which is integrated into a roller 12 of a roller track. The roller 12 has a rotatable axle 14 about which the actual roller element 16 of the roller 12 rotates. The sensor 10 comprises a plurality of measurement capacitances which are each formed between pairs or groups of measuring electrodes 18. An object located at the roller 12 influences the field 20 of the measurement capacitances and can be recognized thereby.

The measuring electrodes 18 are connected to the roller element 16 and thus execute its rotation as well. Coupling electrodes 22 are provided at the rotatable axis 14 and thus at rest with respect to the rotation of the roller 12. Further fields 24 are thereby formed in coupling capacitances between the coupling electrodes 22 and the measuring electrodes 18. The rotating measurement capacitances are in this manner capacitively connected to the stationary part of the roller 12. Separating lines between the resting and the rotating part of the roller 12 are drawn by dotted lines 26 in FIG. 1.

A measurement unit 28 which is connected to the coupling electrodes 22 is likewise provided stationary with the rotatable axle 14. The measurement unit 28 can respectively control pairs or groups of measuring electrodes 18 to determine measurement capacitances and thereby to detect capacitance changes on the basis of objects. An evaluation unit 30 receives these raw data of the various capacitance signals determined by the measurement unit 28 and evaluates them further, for example to output a binary switch signal in dependence on the presence of an object. The evaluation unit 30 can be provided on a chip with the measurement unit, as a separate component and also externally outside the roller 12.

In the embodiment of the sensor 10 in accordance with FIG. 1, the measuring electrodes 18 and the coupling electrodes 22 are each of ring shape so that they appear as two-part in the sectional representation. The field 24 for coupling between the stationary part and the movable part of the roller 12 is therefore located between two concentric rings during the total revolution of the roller 12, said rings being respectively formed by a measuring electrode 18 and a coupling electrode 22. The field 20 of the measurement capacitance is spanned between two adjacent rings of a pair of measuring electrodes 18.

FIG. 2 shows an equivalent circuit diagram of the serial connection of capacitors formed by the measuring electrodes 18 and the coupling electrodes 22 for the contactless signal transmission between the stator and the rotor. A dotted line 26 again separates the resting part and the co-moved part of the roller 12. The measurement unit 28 can control a plurality of measurement channels, with FIG. 2 showing three measurement channels purely by way of example. Each measurement channel has a serial connection from a coupling capacitor 32 to the signal guide into the rotating system, from a measurement capacitor 34 variable in dependence on the presence of objects in the rotating system and in turn from a coupling capacitor 36 to the signal guide from the rotating system. In the embodiment in accordance with FIG. 1, the ring-shaped measuring electrodes 18 have a dual function at the same time as a counter-piece of the coupling electrodes for the formation of the coupling capacitors 32, 36. In other embodiments, physically separate electrodes 22 are provided which are, however, conductively connected as in the equivalent circuit diagram in accordance with FIG. 2.

The measurement principle is therefore based on the change in the measurement capacitance of the measurement capacitor 34 which is connected via two coupling capacitors 32, 36 for bridging the gap between the rotor and the stator of the roller 12. Conveyed objects detune the electrical field 20 and change this measurement capacitance. In the strict sense, a change in the total capacitance of the serial connection of the capacitors 32, 34, 36 is measured, but the measurement capacitor 34 contributes the decisive changes.

The fact that the measuring electrodes 18 are arranged co-rotating at the roller element 16 already per se suppresses a number of interference phenomena which would occur on an attachment of the measuring electrodes 18 in the stationary part of the roller 12. An additional interference suppression is possible by a multichannel pick-up and a corresponding intelligent evaluation. In FIG. 1, an exemplary geometry was shown in which a plurality of signals are detected over a plurality of pairs of ring-shaped measuring electrodes 18 over the longitudinal extent of the roller 12 in parallel with the rotatable axle 14. An axial spatial resolution is thus achieved. A spatial resolution can also be achieved in the peripheral direction thanks to a refinement of the geometry of the measuring electrodes.

FIG. 3 shows a three-dimensional outer view of the measuring electrodes 18 in a further embodiment. On the one hand, a plurality of mutually decoupled segments 38a-d are provided in an axial direction here. On the other hand, a plurality of measuring electrodes 18 are distributed within the segments 38a-d over the peripheral direction, for example for differential compensation within a segment 38a-d. A matrix of measurement capacitances thus arises having spatial resolution in an axial direction and in the peripheral direction. The number of segments 38a-d and of the measuring electrodes 18 within the segments 38a-d varies in dependence on the embodiment and results from different marginal conditions and demands such as the roller diameter, spatial resolution, sensitivity of the capacitive measurement, the required robustness of the capacitive measurement with respect to film formation on the roller 12, the required capacitance of the measurement capacitors 34 and the like.

It must be noted that the representation of FIG. 3 is artificial in that the measuring electrodes 18 are typically arranged beneath the actual roller element 16 and are thus not visible from the outside. Measuring electrodes 18 preferably do not come directly into contact with conveyed objects; the roller element 16 itself better withstands such strains. The roller element 16 may naturally not form any metallic surface or metallic lattice since otherwise the measuring electrodes 18 would be screened with respect to the objects. The roller therefore preferably has a non-conductive dielectric material which is optimized with respect to wear.

FIG. 4 shows a sectional representation of a roller track 40 having only two rollers 12a-b with an integrated sensor shown purely by way of example. An object 42 which is recognized with reference to the changes of the field 20 is located above the one roller 12a. Ring-shaped coupling electrodes 22 are provided concentrically to the rotatable axle 14 in the rollers 12a-b. Measuring electrodes 18 are again arranged concentrically thereto, likewise in a ring-shaped arrangement, with a plurality of measuring electrodes 18 being distributed over the periphery. Each of these measuring electrodes 18 forms either a ring segment or is extended in strip shape in the axial direction, that is in a direction perpendicular to the plane of the paper in FIG. 4. A plurality of measurement capacitances can thus be formed in the peripheral direction by a pairwise response of adjacent measuring electrodes 18 to detect signals spatially resolved in the peripheral direction.

FIG. 5 shows a further geometrical embodiment of the coupling electrodes 22 and of the measuring electrodes 18. A transformation from the peripheral direction into the axial direction takes place here by strips 18b attached to rings 18a with the measuring electrodes 18. In the embodiment in accordance with FIG. 1, for example, only the rings, but not the strips, are provided so that the field 20 is formed in the axial direction between the rings and not as in FIG. 4 in the axial direction between the strips 18b. Which arrangement is more advantageous depends on application-specific factors such as object size, detection width and required capacitive sensitivity. In FIG. 4, the separation again extends between the stationary and the rotating part between the coupling electrodes 22 and the measuring electrodes 18, here that is between the concentric inner and outer rings. The measuring electrodes 18 consequently rotate about the coupling electrodes 22. The measuring electrode 18 can in strict terms be divided into the respective ring 18a, which forms a coupling capacitor 32, 36 with a coupling electrode 22, and into a strip 18b, with a respective pair of strips 18b forming a measurement capacitor. In this respect, a respective strip 18b is naturally only conductively connected to exactly one ring 18a since otherwise the measurement capacitor 34 would be short-circuited.

The measurement unit 28 delivers spatially resolved measured data, which can be further evaluated algorithmically in the evaluation unit 30, in a plurality of measurement channels in the axial direction and/or in the peripheral direction depending on the geometrical design of the measuring electrodes 18. The capacitive signals are evaluated individually or in combined form in groups to generate an object signal. In addition to the purely presence recognition of objects 42, more complex evaluations are also conceivable, for instance that an object signal only takes place when at least n measurement channels respond to the object 42 in a defined order and time sequence.

The evaluation can classify objects 42 from their positional information and size information in that the respective magnitude of the capacitance changes and the number of the influenced measurement channels in the axial direction and the number and duration of the influencing of measurement channels in the peripheral direction are taken into account. This delivers useful additional information on the objects 42, but can also be utilized to distinguish objects 42 from interference objects and to exclude the latter.

Since objects 42 run through a plurality of measurement channels after one another or, after a respective complete rotation, through the same measurement channel a number of times, earlier measurements can be utilized to set switch thresholds for later measurements.

In an autocalibration, a rest signal on an absence of objects 42 is monitored by a continuous evaluation of the measurement channels. Slow changes can thereby be recognized and subsequently regulated to dynamically minimize influences by temperature or tolerances, for example. Abruptly occurring changes can also be compensated in that the measurement information is tracked on a rotation of the roller 12 over at least one periphery and a plausibility check takes place.

The evaluation unit 30 can derive the transport direction of the objects 42 from the order and from the signal curve in the measurement channels. It can furthermore be determined whether the roller 12 rotates at all. For this purpose, for example, a reference element is attached at the outer periphery of the roller 12 where no objects 42 are conveyed, that is at the bottom, for example. A regular influencing of the respective measurement capacitors 34 located there is expected from this reference element. If it does not occur, a conclusion can be drawn on a standstill of the roller 12 and other interference phenomena can furthermore also be recognized and reported or recalibrated by unexpected changes of the signal measured at the reference element.

Concepts such as frequency jump or codings by pseudo-random sequences are conceivable for suppressing interference in rough industrial environments for the measurements of the capacitances. The system thereby becomes robust toward electromagnetic interference.

The invention claimed is:

1. A capacitive sensor for a roller of a roller track which has a plurality of measuring electrodes as well as a measurement unit for determining capacitances between measuring electrodes to recognize an object located at the roller track with reference to capacitance changes,
wherein at least some of the measuring electrodes are arranged co-rotating with the roller, and thus form rotating measurement capacities between the measuring electrodes co-rotating with the roller.

2. The sensor in accordance with claim 1,
further comprising coupling electrodes which are arranged stationary with respect to a rotatable axle of the roller and which form coupling capacitances with measuring electrodes.

3. The sensor in accordance with claim 2,
wherein first coupling electrodes form a stationary ring and second coupling electrodes form a ring co-rotating with the roller.

4. The sensor in accordance with claim 1,
wherein the measuring electrodes are configured in ring shape about a rotatable axis of the roller.

5. The sensor in accordance with claim 4,
wherein the ring-shaped measuring electrodes simultaneously act as coupling electrodes.

6. The sensor in accordance with claim 4,
wherein the ring-shaped measuring electrodes are segmented in the peripheral direction.

7. The sensor in accordance with claim 1,
wherein the measuring electrodes have elongated strips in the axial direction of the roller.

8. The sensor in accordance with claim 7,
wherein the strips are connected to a ring.

9. The sensor in accordance with claim 1,
which has a plurality of segments with respective mutually decoupled measuring electrodes in the axial direction.

10. The sensor in accordance with claim 1,
further comprising an evaluation unit configured to calculate a capacitance change which is resolved in space and/or time from the capacitances determined by the measurement unit and to detect or classify objects according thereto.

11. The sensor in accordance with claim 10,
wherein the evaluation unit is configured to determine geometry properties or movement paths of detected objects.

12. The sensor in accordance with claim 10,
wherein the evaluation unit is configured to determine a reference signal on an absence of objects.

13. The sensor in accordance with claim 12,
wherein the evaluation unit is configured to determine the reference signal again cyclically or on request.

14. The sensor in accordance with claim 10,
wherein the evaluation unit is configured for a rotational monitoring of the roller with reference to the capacitance measured with a reference element attached in the peripheral direction of the roller.

15. A roller having a sensor having a plurality of measuring electrodes as well as a measurement unit for determining capacitances between measuring electrodes to recognize an object located at a roller track with reference to capacitance changes, wherein at least some of the measuring electrodes are arranged co-rotating with the roller, and thus form rotating measurement capacities between the measuring electrodes co-rotating with the roller.

16. A method for recognizing objects located at a roller track,
wherein capacitances are measured in a roller of the roller track between a plurality of measuring electrodes and the presence of an object is recognized with reference to capacitance changes,
wherein capacitances are measured between measuring electrodes which co-rotate with the roller, and thus form rotating measurement capacities between the measuring electrodes which co-rotate with the roller.

* * * * *